United States Patent [19]

Suzuki et al.

[11] 4,151,453
[45] Apr. 24, 1979

[54] INDUCTION MOTOR CONTROL SYSTEM

[75] Inventors: Shigehiko Suzuki; Satoshi Imaiida, both of Inazawa, Japan

[73] Assignee: Mitsubishi Denki Kabushiki Kaisha, Japan

[21] Appl. No.: 880,015

[22] Filed: Feb. 21, 1978

[30] Foreign Application Priority Data

Feb. 18, 1977 [JP] Japan .................. 52-16741

[51] Int. Cl.² .............................................. H02P 3/20
[52] U.S. Cl. ...................................... 318/762; 318/812
[58] Field of Search ................ 318/211, 212, 227, 230

[56] References Cited

U.S. PATENT DOCUMENTS

| 3,514,682 | 5/1970 | Corey | 318/212 |
| 3,866,097 | 2/1975 | Anzai et al. | 318/212 |
| 3,897,595 | 7/1975 | Fearno | 318/212 |
| 4,072,880 | 2/1978 | Oshima et al. | 318/227 |

Primary Examiner—Gene Z. Rubinson
Attorney, Agent, or Firm—Wenderoth, Lind & Ponack

[57] ABSTRACT

The present invention is an induction motor control system which prevents an excessive induced voltage across the thyristors providing DC braking control. The amount of DC braking torque is controlled by the time of application of the DC braking voltage to the induction motor through a phase-control capacitor which sets the time of firing the braking thyristors within each half cycle of the AC voltage. In a first embodiment the firing of all the braking thyristors is inhibited upon application of the DC braking control signal until the half cycle of the AC voltage associated with a predetermined braking thyristor. In a second embodiment the firing of a predetermined braking thyristor is inhibited during the half cycle of the AC voltage of the application of the DC braking control signal and the next succeeding half cycle. In both embodiments the braking thyristors are fired during their associated half cycle of the AC voltage thereafter to apply a continuing DC braking voltage to the induction motor.

6 Claims, 7 Drawing Figures

INDUCTION MOTOR CONTROL SYSTEM

BACKGROUND OF THE INVENTION

This invention relates to an induction motor control system, and more particularly to improvements in a control circuit including switching elements such as thyristors to control the DC braking torque produced by an induction motor.

There are known induction motor control systems of the type comprising bidirectional thyristors for controlling an induction motor while operating in the running control mode and a rectifier circuit including at least one pair of unidirectional thyristors for controlling the induction motor while operating in the DC braking control mode. At the instant of changing from the running control mode to the DC braking control mode, the induction motor produces an induced voltage thereacross and the unidirectional thyristors have additionally and differentially applied thereacross the induced voltage and the secondary voltage across the rectifier transformer included in the rectifier circuit. As a result, a high direct current flows through the induction motor whose current is abnormally high as compared with the applied control signal for changing the operation of the induction motor from the running control mode to the DC braking control mode. This has consciously occurred particularly when an induction motor being operated in the regenerative control mode is decelerated by changing to the DC braking control mode.

Accordingly it is an object of the present invention to provide an induction motor control system comprising a new and improved control circuit means for controlling the DC braking torque produced by an induction motor so as to suppress the abnormally high direct current as above described to a magnitude which is nearly zero.

SUMMARY OF THE INVENTION

The present invention provides an induction motor control system comprising a source of AC voltage, an induction motor, a rectifier circuit means including at least two braking thyristors and connected between the source and the induction motor to control the DC braking torque produced by the induction motor, a gate pulse generation circuit means including a firing circuit for firing the braking thyristors and responsive to a DC braking control signal applied to the firing circuit to disable the braking thyristors to be fired upon initiating the DC control of the induction motor and during the half cycle of the voltage of the source in which the control signal is applied to the firing circuit, and to positively fire a predetermined one of the braking thyristors in the first plate.

In a preferred modification of the present invention the gate pulse generation circuit means may be responsive to the DC braking control signal to disable the remaining one of the braking thyristors to be fired during both the half cycle of the source voltage as above described and the next succeeding half cycle thereof and then alternately fire the braking thyristors.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

Figure 1:
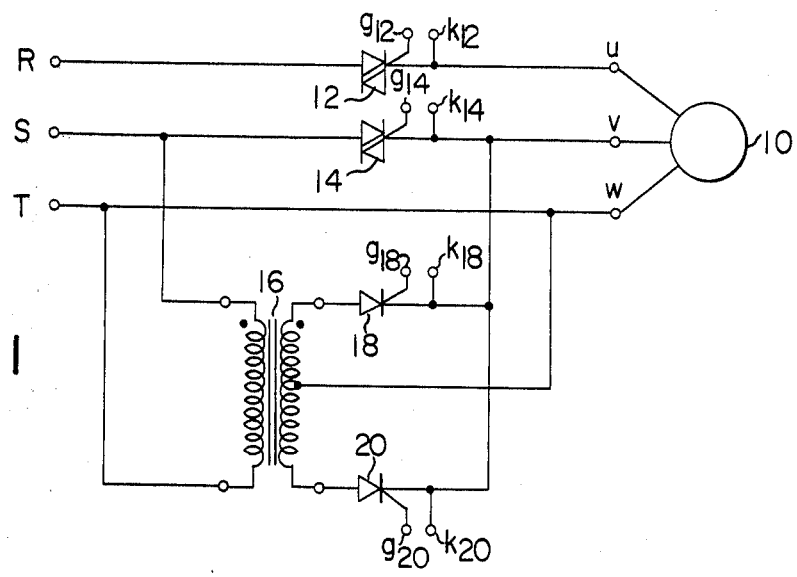
FIG. 1 is a schematic circuit diagram of a conventional induction motor control system.

Referring now to the drawings in detail and FIG. 1 in particular, there is illustrated a conventional induction motor control system. The arrangement illustrates a three-phase induction motor 10 including three input terminals u, v and w and a source of three-phase voltage represented by its output terminals R, S and T. The source terminal R is connected to the input terminal u of the induction motor 10 through bidirectional thyristor 12, the source terminal S is connected to the input terminal v through bidirectional thyristor 14 and the source terminal J is connected to the input motor terminal w without a thyristor interposed therebetween.

The arrangement further comprises a rectifier transformer 16 including a primary winding connected across the source terminals S and T and a center-tapped secondary winding. The secondary winding has a central tap connected to the input terminal w of the induction motor 10 and two ends connected to the input motor terminal v through respective individual unidirectional thyristors 18 and 20. The thyristors 18 and 20 include anode electrodes connected to the respective ends of the secondary winding of the transformer 16 and respective cathode electrodes connected to the input motor terminal v.

The thyristors 12, 14, 18 and 20 include cathode and gate terminals k and g suffixed with the reference numerals designating the associated thyristors. For example the thyristor 12 includes the cathode terminal $k_{12}$ and the thyristor 18 includes the gate terminal $g_{18}$.

The transformer 16 forms a center-tapped rectifier circuit with the unidirectional thyristors 18 and 20. The rectifier circuit includes an input side connected across the phase conductor interconnecting the terminals T and w without a bidirectional thyristor interposed therebetween and one of the remaining phase conductors, in this case, the phase conductor connecting the source terminal S to the input motor terminal v through the thyristor 14. The output is connected across the same conductors except that the thyristor 14 is interposed therebetween.

In FIG. 1 et seq the dot convention is used to define the phase of the voltage developed across the associated transformer winding. In FIG. 1 it is seen that the anode electrode of the thyristor 18 is connected to that end of the secondary transformer winding having an AC voltage in phase with the source voltage across the terminals S and T (this end is called hereinafter the first end), while that anode electrode of the thyristor 20 is connected to the other end (hereinafter called the second end). At the second end a voltage appears with the polarity opposite from that of the source voltage.

Figure 2:
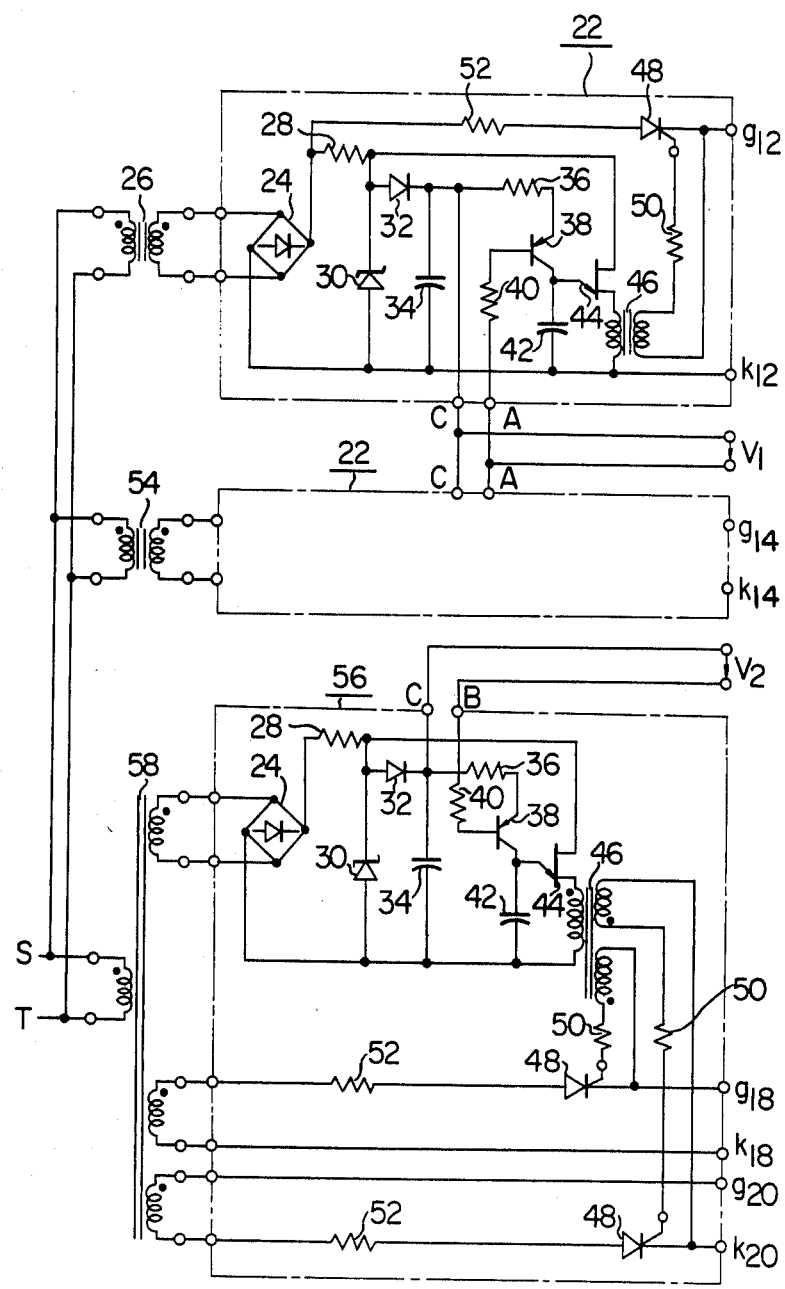
FIG. 2 is a circuit diagram of conventional gate pulse generators for controlling the firing of the thyristors shown in FIG. 1.

FIG. 2 shows a conventional gate pulse generator for controlling the firing of the thyristors 12, 14, 18 and 20 shown in FIG. 1. The arrangement illustrated includes a gate pulse generation circuit generally designated by the reference numeral 22 provided for the bidirectional thyristor 12.

The gate pulse generation circuit 22 comprises a fullwave rectifier bridge 24 formed of semiconductor diodes including a pair of AC input terminals connected across the secondary winding of a transformer 26 which supplies a synchronous voltage to the circuit 22. That is, the transformer 26 includes a primary winding connected across the source terminals S and T. The rectifier bridge 22 also includes a pair of DC output terminals one of which forms a negative terminal connected to a terminal $k_{12}$ and the other of which forms a positive terminal connected to a resistor 28. Resistor 28 is connected to the negative terminal of the rectifier bridge 22 through a Zener diode 30 and also to the anode electrode of a semiconductor diode 32 whose cathode electrode is connected to the negative rectifier terminal through a capacitor 34.

In this way a source of DC voltage has been formed for energizing the firing circuit for the thyristor 12 as will be subsequently discribed.

The diode 32 is connected to a resistor 36 that is, in turn, connected to the emitter electrode of a PNP transistor 38 which has a base electrode connected to a resistor 40 and a collector electrode connected to the negative rectifier terminal through a phase control capacitor 42. The collector electrode of the transistor 40 is also connected to the emitter electrode of a unijunction transistor 44 which has one base electrode connected to the resistor 28 and the other base electrode connected to the negative rectifier terminal through the primary winding of a pulse transformer 46. The pulse transformer 46 includes a secondary winding connected at its first end to the gate electrode of an amplifying thyristor 48 through a resistor 50. The thyristor 48 includes a cathode electrode connected to both the terminal $g_{12}$ and the second end of the secondary winding of the pulse transformer 26 and an anode electrode connected to the positive rectifier terminal through a resistor 52.

The resistor 40 is connected to a terminal A while the junction of the diode 32 and the resistor 36 is connected to a terminal C. The terminals A and C are called input terminals for running control. A running control signal $V_1$ is adapted to be applied across these terminals. The terminal $k_{12}$ is connected to the cathode terminal $k_{12}$ and the terminal $g_{12}$ is connected to the gate terminal of $g_{12}$ of the bidirectional thyristor 12 shown in FIG. 1.

From the foregoing, it is seen that the components 36 through 52 form a firing circuit for the thyristor 12.

The pulse generation circuit for the thyristor 14 is identical to that for the thyristor 12 as above described and is schematically designated by broken line block 22. However a separate transformer 54 similar to the transformer 26 is provided and also energized through the source terminals S and T. Also terminal $k_{14}$ is connected to the cathode terminal $k_{14}$ and the terminal $g_{14}$ is connected to the gate terminal $g_{14}$ of the thyristor 14 shown in FIG. 1 and a pair of running control input terminals A and C are connected to the corresponding terminals of the pulse generator circuit 22 for the thyristor 12.

A pulse generation circuit for the unidirectional thyristors 18 and 20 generally designated by the reference numeral 56 is similar to that above described in conjunction with the thyristor 12 except in the following respects: The pulse transformer 46 includes a pair of secondary windings similarly coupled to the thyristors 18 and 20 while the transformer 58 which is energized from the source terminals S and T includes, in addition to the secondary winding connected to the rectifier bridge 24, a pair of secondary windings one connected across terminals $k_{18}$ and $g_{18}$ and one connected across terminals $k_{20}$ and $g_{20}$ through resistors 52 and thyristors 48. Then the terminals $k_{18}$ and $g_{18}$ or $k_{20}$ and $g_{20}$ are connected to the cathode and gate terminals of the respective thyristor 18 or 20. Further a pair of input terminals B and C for DC braking control are substituted for the input terminals A and C for running control.

When a running control signal $V_1$ is applied across the input terminals A and C, common to both pulse generation circuits 22, each pulse transformer 46 produces across the secondary winding a pulse having a firing phase as determined by the signal $V_1$ in the well known manner. The pulse causes each thyristor 48 to become conducting resulting in the firing of the bidirectional thyristors 12 and 14. This causes the source R-S-T to supply to the induction motor 10 a three-phase voltage proportional to the firing angle of the thyristors 12 and 14. Thus the induction motor 10 produces a running torque proportional to the square of the voltage applied thereacross until the running torque balances the load torque. At that time, the induction motor 10 has its rotational speed controlled by the input signal $V_1$.

On the other hand, when a DC braking control signal $V_2$ is applied across the input terminals B and C to bring the induction motor 10 into the DC braking control mode of operation, the rectifier circuit 16-18-20 is enabled to apply a DC voltage across the induction motor 10. Thus the induction motor 10 produces a DC braking torque which can be, in turn, controlled by the input signal $V_2$.

In this way the control circuit as shown in FIGS. 1 and 2 can readily control the running and braking torques produced by the induction motor 10 in response to the input signal $V_1$ and $V_2$ respectively. However it is noted that the simultaneous application of the input signals $V_1$ and $V_2$ causes the formation of a shortcircuit across the source. For example, the shortcircuit may be traced from the source terminal T through the transformer 16, one of the unidirectional thyristor 18 or 20 and the bidirectional thyristor 14 to the source terminal S. In order to avoid the formation of such a shortcircuit, it is required to necessarily switch from one to the other of the signals $V_1$ and $V_2$ *l and then apply the switched signal across the input terminals A and C or B and C as the case may be.*

However it is noted that at the instant of changing the operation of the induction motor from the running control mode to the braking control mode, the induction motor 10 has a voltage induced thereacross and that induced voltage and the secondary voltage across the transformer 16 are additively applied across one of the unidirectional thyristors 18 and 20 while being differentially applied across the other thyristor. This has resulted in the great disadvantage that the induction motor 10 carries an abnormally large direct current as compared with the braking control signal $V_2$. The phenomenon just described has been consciously developed particularly when the induction motor 10 operating in the regenerative breaking mode is decelerated by changing it to the DC braking mode of operation. In the regenerative braking mode of operation, the source voltage is applied to the induction motor 10 through the bidirectional thyristors 12 and 14 maintained fully fired.

Figure 3:
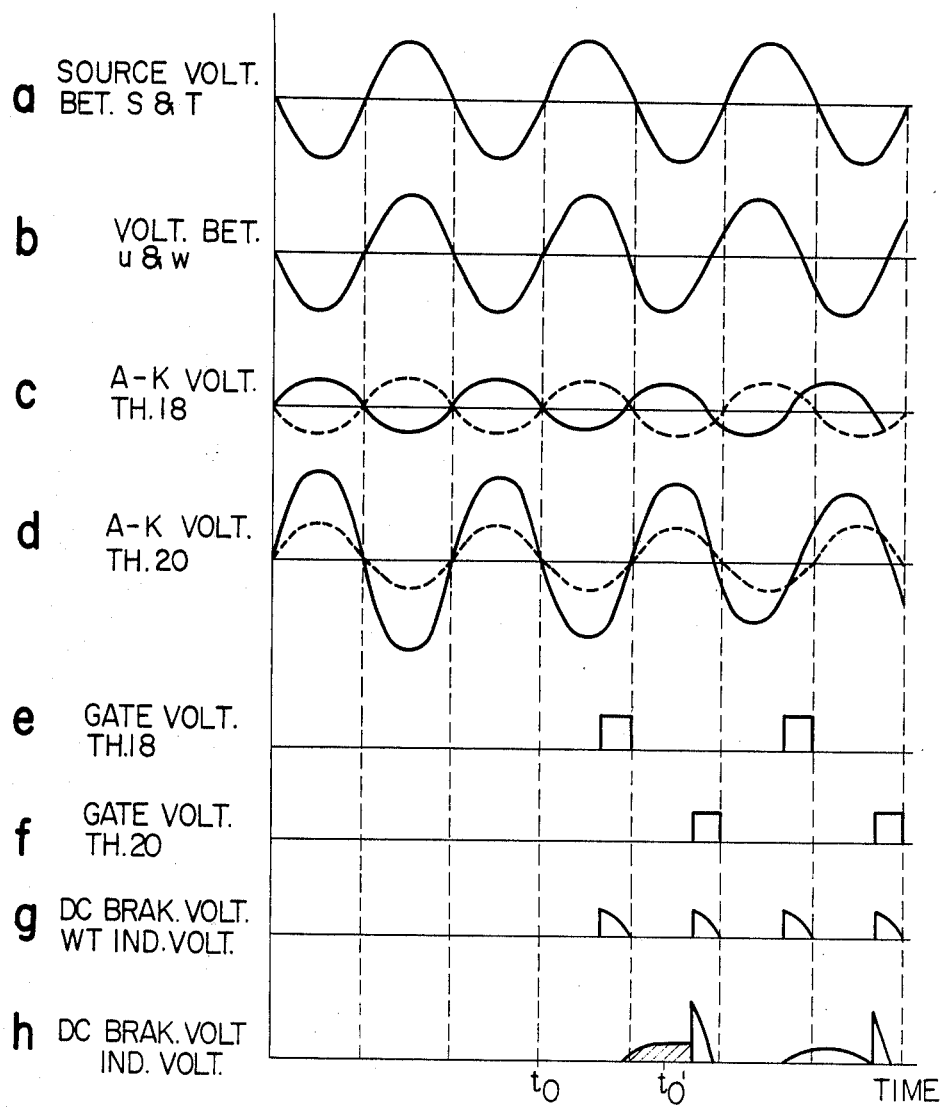
FIG. 3 is a graph illustrating voltage waveforms developed at various points in the arrangement shown in FIG. 1.

This will now be in more detail described in conjunction with FIG. 3 wherein there are illustrated voltage waveforms developed at various points in the arrangement of FIG. 1. In FIG. 3 a waveform a illustrates the source voltage across the source terminals S and T while a voltage waveform b is developed across the input terminals v and w to the induction motor 10. Solid waveforms c and d depict the voltages across the anode and cathode electrodes of the unidirectional thyristors 18 and 20 respectively and the dotted waveforms c and d depict the voltages across the anode and cathode electrodes of the thyristors 18 and 20 due to the transformer 16. It is noted that the induction motor enters the DC braking control mode of operation at and after time point $t_0$ and the waveforms b, c and d appearing at and after that time point describe the associated voltages with the thyristors 18 and 20 maintained unfired.

After time point $t_0$ gate voltages shown at waveforms e and f are applied to the gate electrodes of the thyristors 18 and 20 in synchronization with the secondary voltage across the transformer 16. The waveforms e alternate with the waveforms f as will readily be understood from dots denoted aside the secondary windings of the transformers 16 and 46 (see FIGS. 1 and 2).

The waveforms e and f are applied to the gate electrodes of the thyristors 18 and 20 to fire them to cause a DC braking voltage (see waveform g, FIG. 3) to be applied across the input terminals v and w to the induction motor 10 in the absense of a voltage induced thereacross and on the assumption that windings disposed on the induction motor 10 have negligibly low inductances. However, when the induction motor 10 has an induced voltage, the DC braking voltage across the input motor terminals v and w is becomes that shown at waveform h in FIG. 3.

After the induction motor 10 has entered the DC braking control mode of operation at time point $t_0$, the induced voltage across the induction motor 10 causes the phases of the voltages across the anode and cathode electrodes of the unidirectional thyristors 18 and 20 to be shifted from the phase of the secondary voltage across the transformer 16 as shown at waveforms c and d in FIG. 3. Therefore the phase control of the thyristors 18 and 20 is disabled with the result that an abnormally high braking torque is produced by the induction motor 10, as a result of a high DC voltage being applied to the motor to permit the flow of abnormally high DC braking current.

The present invention contemplates avoiding the problem as described above by the provision of an induction motor control system preventing the induction motor from producing an abnormally high braking torque upon changing from the running control mode or regenerative braking control mode to the DC braking control mode of operation.

In FIG. 3 the waveform b developed at and after time point $t_0$ depicts the voltage induced across the induction motor 10 with the unidirectional thyristors 18 and 20 maintained unifired. Once a sufficiently high magnitude of the DC braking current has flowed through the induction motor 10, the induced voltage thereacross abruptly. Accordingly, a voltage subsequently induced across the motor has very small effect upon the system.

Further FIG. 3 illustrates the voltage waveforms on the assumption that the unidirectional thyristor 18 is first fired and then the other thyristor 20 is fired. As seen from solid waveforms c and d, the thyristor 20 has applied thereacross the sum of the induced voltage across the induction motor 10 and the secondary voltage across the transformer 16 while the thyristor 18 has the applied thereacross the difference between these voltages. Assuming that the thyristor 20 has been first fired to cause the induced voltage across the inductor to decay, the hatched portion of the voltage waveform h shown in FIG. 3 is not applied across the induction motor 10. Further assuming that, even with the thyristor 20 first fired, the control signal $V_2$ is applied across the terminals B and C (see FIG. 2), for example, at time point $t_0'$ (see FIG. 3) which is in a negative half cycle of the source voltage, the thyristor 20 can be fired only through a firing angle which is small compared with the input control signal $V_2$. This is because in the gate pulse generator 56 as shown in FIG. 2 the phase control capacitor 42 is initiated to charge at time point $t_0'$. As a result, the current does not sufficiently flow through the induction motor 10 to insufficiently attenuate the induced voltage thereacross. Consequently, the shift of phase between each of the anode-to-cathode voltages across the thyristors 18 and 20 and the secondary voltage across the transformer 16 remains intact in the next succeeding half cycle of the source voltage, the thyristor 18 is fully fired to permit a flow of abnormally high DC braking current through the induction motor 10 in that half cycle thereof.

With the abovementioned respects in view, the present invention comprises a gate pulse generation circuit for DC braking control thyristors operative to prevent those thyristors such as the thyristors 18 and 20 from being fired in that half cycle of the source voltage having a control signal such as signal $V_2$ applied to the circuit at the beginning of the DC braking control mode of operation. Then the firing of the thyristors always starts with that thyristor additionally supplied with the voltage induced across the controlled induction motor and the secondary voltage across the DC braking control transformer with a firing angle thereof proportional to the DC braking control signal. This measure can suppress the DC braking current flowing through the induction motor to a magnitude that is nearly zero which current would otherwise amount to an abnormally high magnitude because the phase control of the other thyristor is disabled under the influence of a voltage induced across the induction motor upon changing it to the DC braking control mode of operation.

Figure 4:
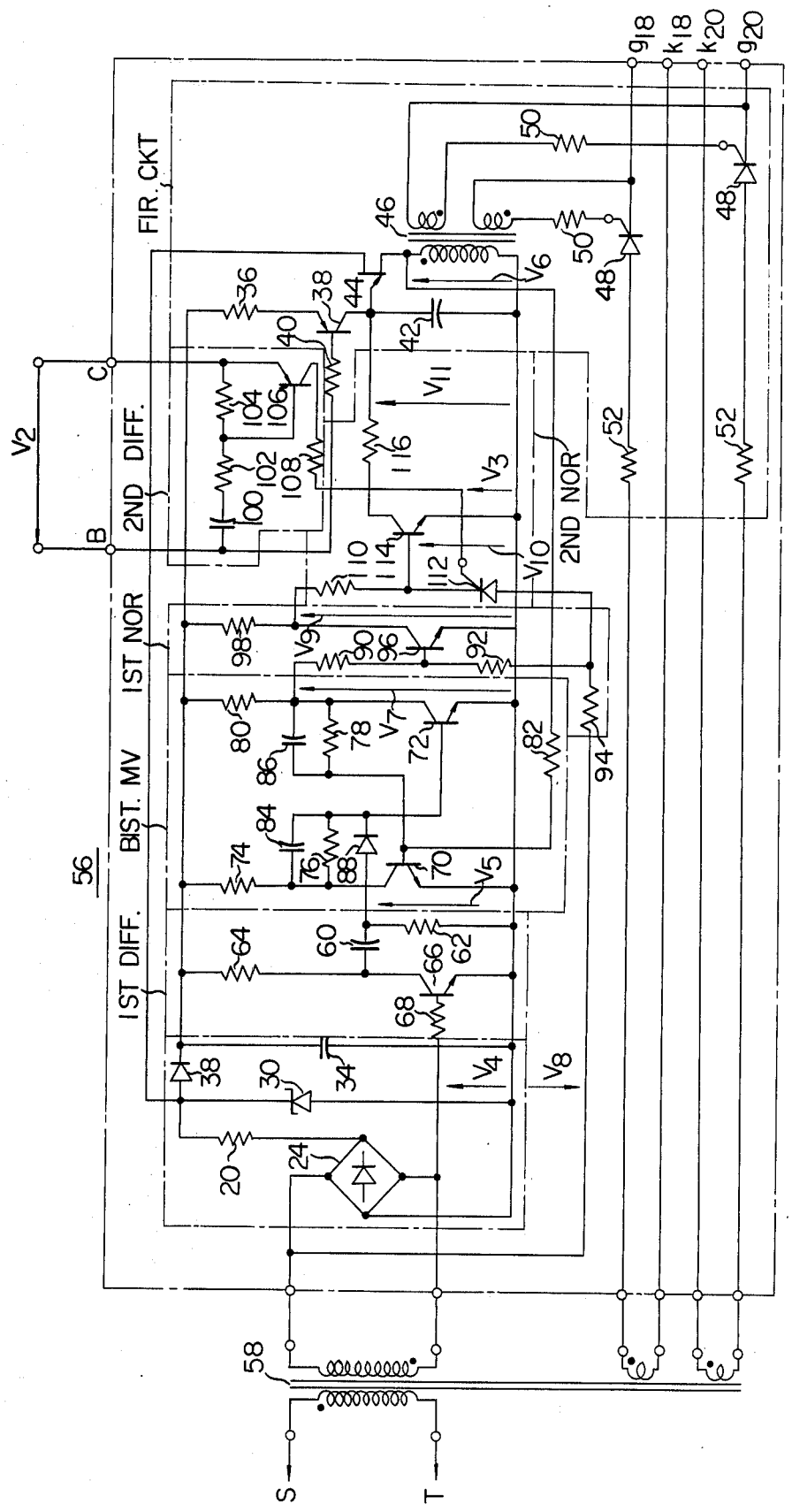
FIG. 4 is a circuit diagram of a gate pulse generator constructed in accordance with the principles of the present invention to control the firing of the thyristors for the DC braking control of the induction motor shown in FIG. 1.

According to the principles of the present invention, the gate pulse generation circuit is constructed into a circuit configuration as shown in FIG. 4 wherein like reference numerals designate components identical to or similar to those illustrated in FIG. 2. The gate pulse generation circuits for the bidirectional thyristors used in the running control mode may be identical to those shown by the reference numeral 22 in FIG. 2. The arrangement illustrated in FIG. 4 is different from that labelled 56 in FIG. 2 only in that in FIG. 4 a circuit for determining a firing initiation phase is connected between the source of DC voltage and the firing circuit.

More specifically, a series combination of a capacitor 60 and a resistor 62 is connected between the diode 38 and the negative rectifier terminal through a resistor 64.

An NPN common emitter transistor 66 has a collector electrode connected to the capacitor 60 and a base electrode connected to a first end of the secondary winding of the transformer 58 through a resistor 68. Thus a first differentiator is formed to pass a portion $V_4$ of the secondary voltage across the transformer 58 through the resistor 68 and the transistor 66 to the capacitor 60 to generate a train $V_5$ of positive differentiated pulses alternating with negative differentiated pulses across the resistor 62 one for each zero crossing. When the source voltage across the terminals S and T changes from its positive to its negative magnitude through the voltage zero, the differentiated pulse is positive, and vice versa. The differentiator may be called hereinafter a differentiated pulse generator A.

The resistor 62 is connected to a bistable multivibrator of well known construction including a pair of NPN common emitter transistors 70 and 72 connected to resistors, 74, 76, 78, 80 and 82, capacitors 84 and 86 and a semiconductor diodes 88 in the manner as shown in FIG. 4. Only the positive pulse $V_5$ across the resistor 2 is supplied, as a reset pulse to the base electrode of the transistor 72 through the diode 88 and a trigger pulse from the primary winding of the pulse transformer 44 is supplied to the resistor 82.

The transistor 72 includes a collector electrode connected to a resistor 90 subsequently connected to the second end of the secondary winding of the transformer 58 through serially connected resistors 92 and 94. The junction of the resistors 90 and 92 is connected to a base electrode of an NPN common emitter transistor 96 which has a collector electrode that is connected to the diode 38 through a resistor 98. The components 90 through 98 form a first "NOR" element having a pair of inputs formed by the resistors 90 and 94 and an output formed of the collector electrode of the transistor 96. It will be understood that an output $V_7$ from the bistable multivibrator or the collector electrode of the transistor 72 is applied, as one input, to the resistor 90 and a half-wave rectified voltage $V_8$ developed during negative half cycle of the source voltage serves as the other input to the resistor 94. The "NOR" element provides a positive output $V_9$ at the collector electrode of the transistor 96 only when both inputs are null. The first "NOR" element may be called hereinafter "NOR" circuit A.

A pair of input terminals B and C for DC braking control is connected to a series combination of a capacitor 100, and resistors 102 and 104 forming a second differentiator. The differentiator further includes a PNP transistor 106 having a base and an emitter electrode connected across the resistor 104, and a collector electrode connected to the resistor 108. The differentiator differentiates the DC braking control signal $V_2$ applied across the input terminals B and C to deliver a differentiated pulse from the resistor 108. The second differentiator may be called hereinafter a differentiated pulse generator circuit B. As in the arrangement 56 shown in FIG. 2, the terminal B is also connected to the resistor 40 disposed in the firing circuit.

The collector electrode of the transistor 96 is connected to a resistor 110 which is subsequently connected to the cathode electrode of thyristor 112. The thyristor 112 includes an anode electrode connected to the resistor 94 and a gate electrode connected to the resistor 108. The cathode electrode of the thyristor 112 is also connected to the base electrode of an NPN common emitter transistor 114 which has a collector electrode connected to a resistor 116. The resistor 116 is connected to the junction of the collector electrode of the transistor 38 and the capacitor 42 and thence to the emitter electrode of the uni-junction transistor 44. In this way a second "NOR" element has been formed and may be called hereinafter "NOR" circuit B. The "NOR" circuit B provides a null output $V_{10}$ across the base and emitter electrode of the transistor 114 only when the output $V_9$ at the collector electrode of the transistor 96 is null and the thyristor 112 is in its nonconducting state.

The second NOR element includes an output circuit formed of the transistor 114 and the resistor 116 to serve as a circuit for shortcircuiting the phase control capacitor 42.

From the foregoing it is seen that the arrangement of FIG. 4 is equivalent to the gate pulse generation circuit 56 as shown in FIG. 2 having inserted thereinto the differentiated pulse generator circuit A, the bistable multivibrator, and the NOR circuit A and B serially interconnected in the named order and the differentiated pulse generator circuit B connected to the NOR circuit B. In other words, the gate pulse generation circuit 56 shown in FIG. 2 has added thereto a circuit for determining phases at which the associated thyristors such as the thyristors 18 and 20 are initially fired.

Figure 5:
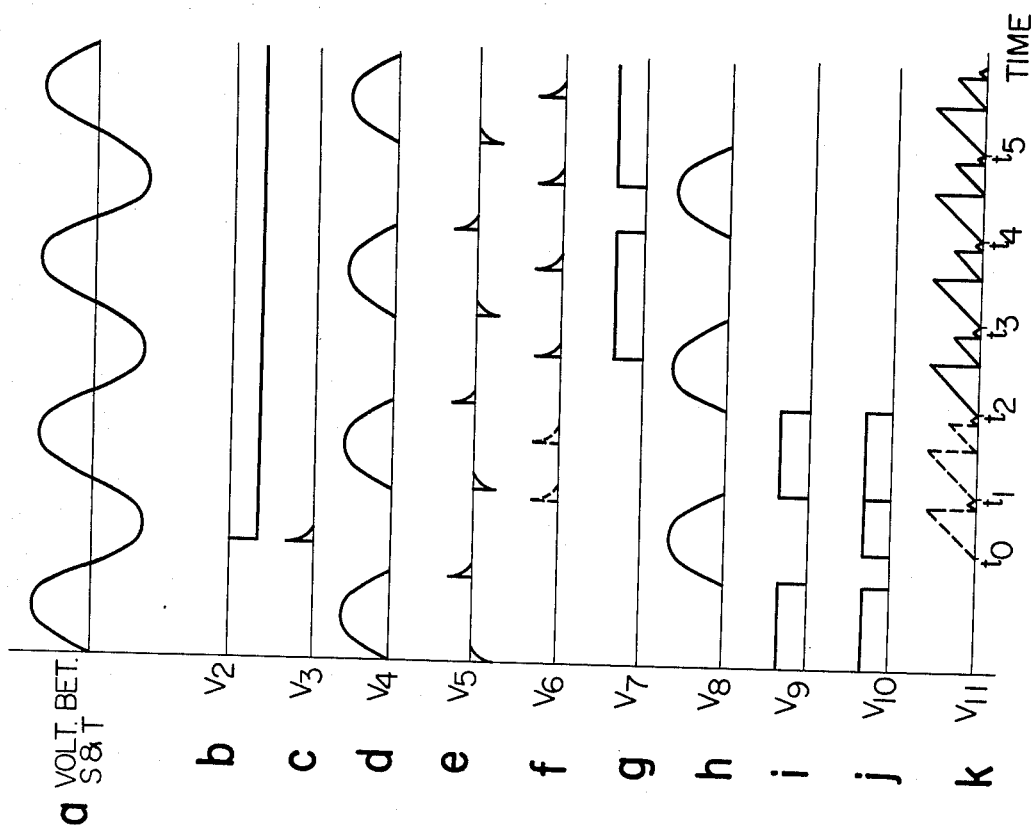
FIG. 5 is a graph illustrating voltage waveforms developed at various points in the arrangement shown in FIG. 4.

The operation of the arrangement shown in FIG. 4 will now be described in conjunction with FIG. 5. In FIG. 5 waveform a depicts the source voltage across the source terminals S and T and waveform b illustrates the DC braking control signal $V_2$ with a negative magnitude that is applied across the input terminals B and C at time point $t_0$ during a negative half cycle of the source voltage to change the operation of the induction motor to the DC braking control mode. As described above, the signal $V_2$ is differentiated by the differentiated pulse generator circuit B to form a derivative of the signal $V_2$ which is designated by $V_3$ and is shown by waveform c of FIG. 5. The waveform c from the resistor 108 is applied to the gate electrode of the thyristor 112 to turn it on with the half-wave rectified voltage $V_8$ being positive during in the negative half cycle of the source voltage (note phase-defining convention dot on the associated secondary winding of transformer 58 and see waveform h, FIG. 5) and applied to the anode electrode thereof. This turn-on of the thyristor renders the voltage $V_{10}$ (see waveform j, FIG. 5) at the base electrode of the transistor 114 positive with respect to the emitter electrode thereof to turn on the transistor 114 thereby to shortcircuit the phase control capacitor 44 through the resistor 116. This results in no pulse $V_6$ appearing at the primary winding of the pulse transformer 44 (see waveform f, FIG. 5). Then time point $t_1$ is reached ending the negative half cycle of the source voltage and the anode voltage of the thyristor 112 becomes null to put that thyristor into its nonconducting state but the NOR circuit A provides a positive voltage $V_{10}$ (see waveform j, FIG. 5) across the base and emitter electrodes of the transistor 114. This is because before time point $t_1$ no pulse transformer from the primary winding of the pulse has been delivered to the bistable multiplier to thereby maintain a null output $V_7$ therefrom and accordingly a null input to the "NOR" circuit A, while the other input $V_8$ thereto is null until time point $t_2$ where a positive half cycle of the source voltage beginning at time point $t_1$ ends. Therefore the phase control capacitor 42 remains shortcircuited by the conducting transistor 114 through the resistor 116. As a result, no pulse is developed across the primary winding of the pulse transformer 44 in the positive half cycle of the source voltage between the time points $t_1$ and $t_2$.

However, as seen from waveform h, a positive voltage $V_8$ is applied to the one input of the NOR circuit A during the next succeeding negative half cycle of the source voltage between time points $t_2$ and $t_3$. Thus the NOR circuit A produces a null voltage $V_9$ at the collector electrode of the transistor 96 (see waveform i, FIG. 5) while the thyristor 112 continues to be in its non-conducting state at and after time point $t_1$ where the anode-to-cathode voltage thereacross has been made null. This causes the turn-off of the transistor 114 to release the phase control capacitor 42 from ground.

Under these circumstances, the capacitor 40 is charged by the collector current through the transistor 38. This current is controlled by the control signal $V_2$ as shown at waveform k, in FIG. 5. This results in the occurrence of a pulse $V_6$ on the primary winding of the pulse transformer 44 at a phase of the source voltage as determined by the control signal $V_2$ (see waveform f, FIG. 5).

The pulse $V_6$ is applied, as a trigger pulse, to the bistable multivibrator (or the base electrode of the transistor 70) to trigger it to produce a positive voltage $V_7$ at the collector electrode of the transistor 72 until time point $t_4$ is reached at the end of the next positive half cycle of the source voltage. At that time point, the differentiated pulse $V_6$ (see waveform f, FIG. 5) resets the multivibrator to produce a null voltage therefrom as shown at waveform g in FIG. 5. Thus the phase control capacitor 40 is left just as it is released from ground in the positive half cycle of the source voltage between time points and $t_3$ and $t_4$ to permit a pulse $V_6$ to appear at the primary winding of the pulse transformer 46 at a phase of the source voltage as determined by the control signal $V_2$ (see waveform f, FIG. 5).

After time point $t_4$ the process as above described is repeated to cause the pulses $V_6$ to continue to appear at the primary winding of the pulse transformer 46 as long as the control signal $V_2$ is applied across the input terminals.

From the foregoing it is seen that each time the pulse $V_6$ is developed on the primary winding of the pulse transformer 44 in each half cycle of the source after the negative half cycle thereof following the applied voltage, the secondary windings of pulse transformer 44 deliver trigger pulses opposite in polarity across the gate and cathode electrodes of the associated thyristors 48 to fire the DC braking control thyristors 18 and 20 alternately with the result that the induction motor 10 is operated in the DC braking control mode as determined by the control signal $V_2$.

Assuming that the control signal $V_2$ is applied across the input terminals B and C in the positive half cycle of the source voltage between time points $t_1$ and $t_2$, the differentiated pulse generator circuit B produces its derivative $V_3$ also between time points $t_1$ and $t_2$. However, the thyristor 112 has a null voltage $V_8$ across its anode and cathode electrodes and is maintained in its non-conducting state. Therefore it is seen that the arrangement of FIG. 4 is operated in the same manner as above described in conjunction with its operation performed at and after time point $t_1$ so that the pulses $V_6$ are developed across the primary winding of the pulse transformer 44 starting with the next negative half cycle of the source voltage between time points $t_2$ and $t_3$.

From the foregoing, it will be understood that in the arrangement of FIG. 4 the application of the braking control signal $V_2$ across the input terminals B and C at any phase of the source voltage is prevented from firing the braking control thyristors 18 and 20 (see FIG. 1) upon initiating the DC braking control of the induction motor in that half cycle of the source voltage in which the control signal $V_2$ is applied across the input terminals B and C. Then the pulse is developed on the primary winding of the pulse transformer 46 always starting with the negative half cycle of the source voltage following the application of the control signal. As a result, it is ensured that the firing always starts with the thyristor 20 or that braking thyristor supplied with the sum of the secondary voltage across the transformer 16 or source voltage and the induced voltage across the induction motor.

From the foregoing it will be also understood that, in order to control the DC braking torque produced by induction motors, the present invention is operative to disable firing of the DC braking thyristors upon initiating the DC braking control and during that half cycle of the source voltage when a control signal is applied across the pair of DC braking control terminals, while the firing control of the thyristors is initiated at a phase when the source voltage applied across the thyristors is added to the induced voltage across the induction motor. This measure can suppress the abnormally high DC braking torque which would be otherwise produced by the induction motor under the influence of a voltage induced thereacross to a magnitude that is nearly zero.

Recall that, when the braking thyristor 20 (see FIG. 1) has been first fired and the induced voltage across the induction motor 10 has sufficiently decayed, the voltage illustrated by the hatched portion of waveform h in FIG. 3 is not applied across the induction motor 10 and an abnormally high current does not flow through the motor 10. However, even if the thyristor 20 would have been first fired, the induced voltage across the induction motor coule have decayed insufficiently thus permitting the flow of an abnormally high current through the motor provided that the control signal $V_2$ is applied across the DC braking control terminals at time point $t_0'$ (see FIG. 3) during the negative half cycle of the source voltage to fire the thyristor 20 through a firing angle small as compared with the control signal $V_2$.

With the abovementioned case in mind, the present invention also contemplates disabling the firing of the braking thyristor 18 (which is differentially supplied with the source voltage and the induced voltage across the induction motor) upon initiating the DC braking control and during that half cycle of the source voltage in which the DC braking control signal $V_2$ is applied across the input terminals B and C and in the next succeeding half cycle thereof and then firing the braking thyristor 20 through a firing angle as determined by the control signal $V_2$ to cause the induced voltage across the induction motor 10 to sufficiently decay. Thereafter both thyristors 18 and 20 are alternately fired.

Figure 6:
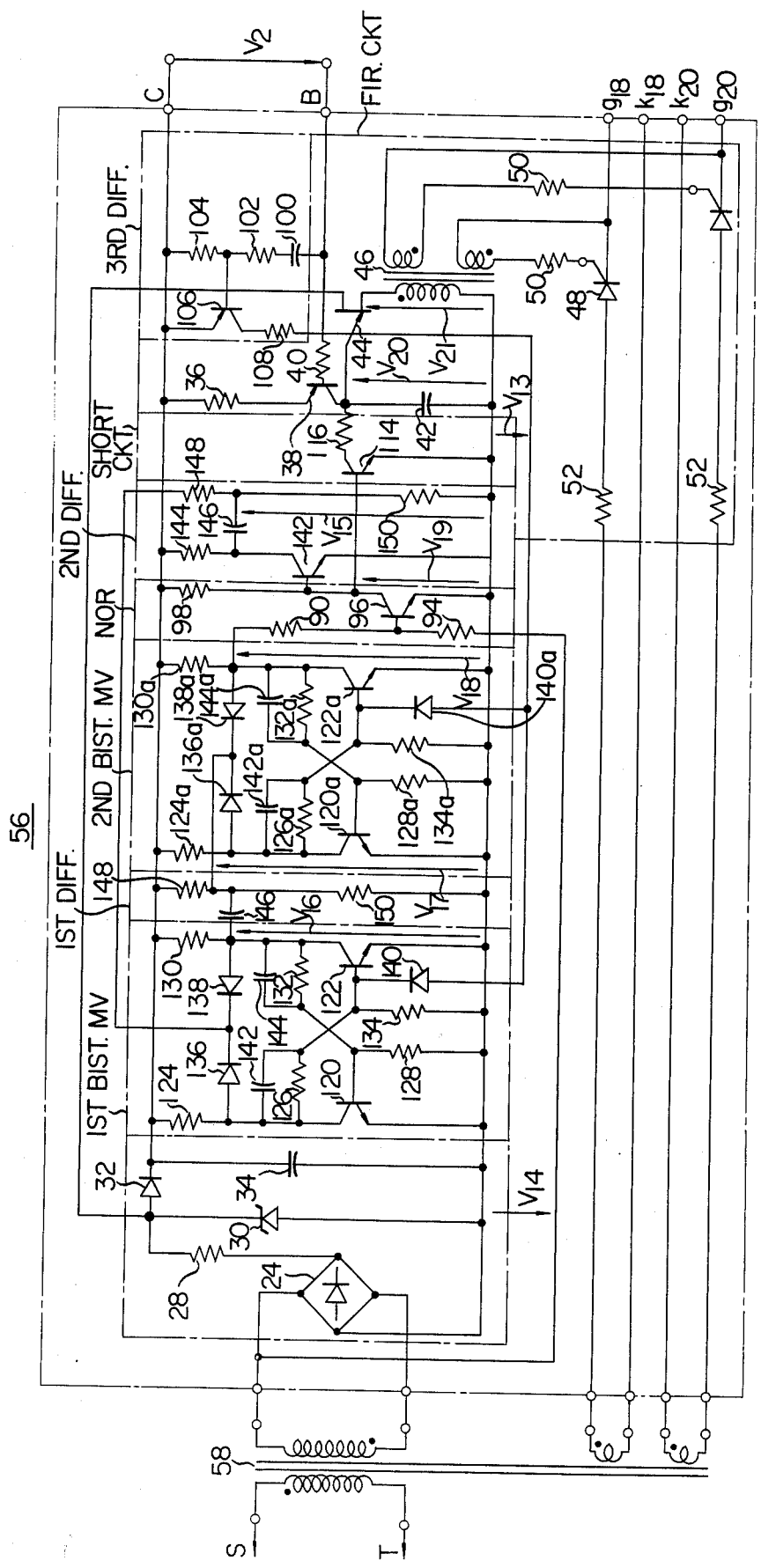
FIG. 6 is a diagram similar to FIG. 4 but illustrating a modification of the present invention.

To this end, the form of the present invention just described can be realized into a circuit configuration as shown in FIG. 6 wherein like reference numerals designate components identical to or corresponding to those shown in FIG. 4. The arrangement illustrated is different from that shown in FIG. 4 only in the construction of the circuit for determining the phase of the source voltage at which the associated thyristors are initially fired.

More specifically, the capacitor 34 is connected across a first bistable multivibrator of conventional construction including a pair of NPN common emitter transistors 120 and 122 connected to resistors 124, 126, 128, 130, 132 and 134, semiconductor diodes 136, 138 and 140 and capacitors 142 and 144 in the manner as shown in FIG. 6. The cathode electrodes of the diodes 136 and 138 are connected together to form a reset input at their junction and the diode 140 includes an anode electrode forming a trigger input. The first bistable multivibrator may be called hereinafter a bistable multivibrator circuit I.

The transistor 122 includes a collector electrode connected to a capacitor 146 which is, in turn, connected to the junction of resistors 148 and 150 serially interconnected between the diode 32 and the negative terminal of the rectifier bridge 22. The capacitor 146 and the resistors 148 and 150 form a first differentiator for differentiating the output from the bistable multivibrator, or the voltage $V_{16}$ at the collector electrode of the transistor 122 to produce a differentiated pulse across the resistor 150. The first differentiator may be called hereinafter a differentiated pulse generator circuit I.

The junction of the capacitor 146 and the resistor 150 is connected to the reset input to a second bistable multivibrator identical in circuit configuration to the first bistable multivibrator. The components of the second bistable multivibrator are designated by the same reference numerals denoting the corresponding components of the first bistable multivibrator with the suffix a. For example, the transistors are designated by the reference numerals 120a and 122a respectively. The second multivibrator may be called hereinafter a bistable multivibrator II and forms a counter circuit with the bistable multivibrator I and the differentiated pulse generator circuit I.

The transistor 122a has a collector electrode connected to a "NOR" element identical to the first "NOR" element shown in FIG. 4 except for the omission of the resistor 92. Therefore like reference numerals have been employed to identify the components identical to those shown in FIG. 4.

The transistor 96 includes a collector electrode connected to a base electrode of an NPN common emitter transistor 142 which has a collector electrode connected to the diode 32 through a resistor 144 and also connected to a capacitor 146. The other terminal of capacitor 146 is connected to the junction of resistors 148 and 150. The resistor 148 is connected to the resrt input of the bistable multivibrator I while the resistor 150 is connected to the negative rectifier terminal.

The DC braking control terminals B' and C' are connected across a third differentiator identical to that shown in FIG. 4. Therefore its components are designated by like reference numerals denoting the corresponding components of the differentiated pulse generator circuit B shown in FIG. 4. However, it is noted that the resistor 108 is connected to the diodes 140 and 140a of the bistrable multivibrators I and II to supply a trigger pulse thereto. This third differentiator may called hereinafter a differentiated pulse generation circuit III.

The transistor 96 in the "NOR" element has a collector electrode connected to the circuit for shortcircuiting the phase control capacitor 42. The latter circuit includes an NPN common emitter transistor 114 and a resistor 116 interconnected in the same manner as above described in conjunction with the NOR circuit B shown in FIG. 4.

In other respects, the arrangement is identical to that shown in FIG. 4.

Figure 7:
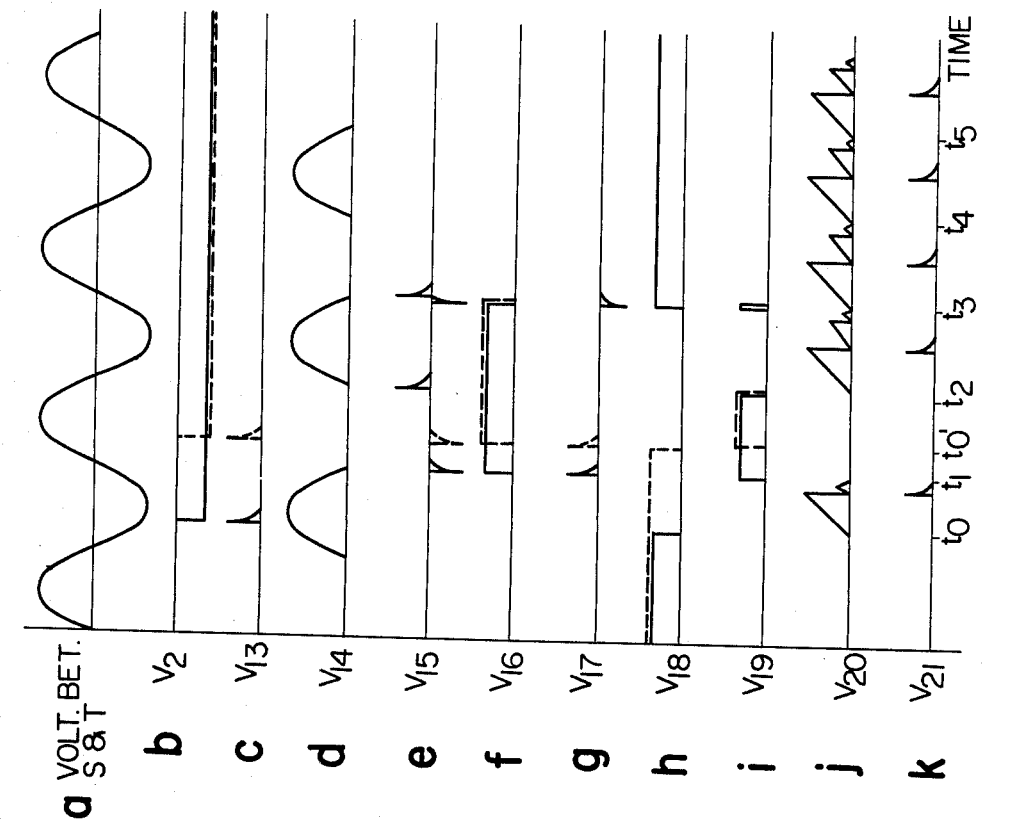
FIG. 7 is a graph illustrating voltage waveforms developed at various points in the arrangement shown in FIG. 6.

The operation of the arrangement shown in FIG. 6 will now be described in conjunction with FIG. 7 wherein there are illustrated voltage waveforms developed at various points in the arrangement of FIG. 6. In FIG. 7 the waveform a illustrates the source voltage across the source terminals S and T (see FIG. 1) and at time point $t_0$ during the negative half cycle of the source voltage a DC braking control signal $V_2$ with a negative magnitude shown at waveform b is applied across the input terminals B and C to put the induction motor 10 (see FIG. 1) into the DC braking control mode of operation. As in the arrangement of FIG. 4, the negative control signal $V_2$ is differentiated by the differentiated pulse generator III to provide a positive derivative $V_{13}$ of the signal as shown at waveform c. That derivative $V_{13}$ is applied to the bistable multivibrators I and II to set them so as to provide null voltages $V_{16}$ and $V_{18}$ at their outputs (see waveforms f and h, FIG. 7).

Also at time point $T_0$, the NOR element has a half wave rectified positive voltage $V_{14}$ from the secondary winding of the transformer 58 applied to one input thereto (see waveform d, FIG. 7) and therefore provides a null voltage $V_{19}$ at the collector electrode of the transistor 96 (see waveform i, FIG. 7). The positive voltage $V_{14}$ is developed during each negative half cycle of the source voltage as in the arrangement of FIG. 4. Thus the transistor 114 is in its non-conducting state in which the phase control capacitor 42 is not shortcircuited. This results in the generation of a saw-toothed wave $V_{20}$ across the capacitor 42 as shown at waveform j in FIG. 7 and hence of a pulse $V_{21}$ across the primary winding of the transformer 46 as shown at waveform k in FIG. 7.

When time point $t_1$ is reached and the next succeeding positive half cycle of the source voltage begins, the positive voltage $V_{14}$ becomes null. This cause the null voltage $V_{14}$ to be applied to the one input to the NOR element and also the output $V_{18}$ from the bistable multivibrator II is maintained null. Thus the NOR element has its output $V_{19}$ changed from its null to its positive magnitude (see waveform i, FIG. 7). That positive output $V_{19}$ is delivered to the differentiated pulse generator circuit II where a negative differentiated pulse $V_{15}$ is generated as shown at waveform e in FIG. 7. That negative pulse $V_{15}$ is applied to the reset input to the bistable multivibrator I to reset it to change the output $V_{16}$ therefrom its null to its positive magnitude (see waveform f, FIG. 7). The differentiated pulse generator circuit I differentiates the positive output $V_{16}$ to deliver a positive differentiated pulse $V_{17}$ (see waveform g, FIG. 7) to the bistable multivibrator II. However the positive pulse $V_{17}$ is disabled to trigger the state of the multivibrator II because it is blocked by the diodes 136a and 138a.

Therefore the output $V_{18}$ from the multivibrator II is maintained null (see waveform h, FIG. 7) and that null voltage is delivered to differentiated pulse generator circuit II.

As a result, the "NOR" element has both inputs at a null voltage and produces a positive output $V_{19}$ during the positive half cycle of the source voltage between time points $t_1$ and $t_2$. This positive half cycle of the source voltage directly follows that negative half cycle thereof having the control signal $V_2$ applied across the input terminals B and C. The positive output $V_{19}$ from the "NOR" element shortcircuits the phase control capacitor 42 with the result that no pulse is developed across the primary winding of the pulse transformer 46.

In the next succeeding negative half cycle of the source voltage between time points $t_2$ and $t_3$, however, the NOR element has a positive voltage $V_{14}$ applied to the one input of the resistor 94 (see waveform d, FIG. 7) and accordingly applies a null output $V_{19}$ to the transistor 114 in the shortcircuiting circuit. This results in the release of the phase control capacitor 42 from ground. Accordingly, the primary winding of the pulse transformer 46 produces a pulse $V_{21}$ between time points $t_2$ and $t_3$ (see waveform k, FIG. 7) as in the negative half cycle of the source voltage between time points $t_0$ and $t_1$.

From waveforms d, e and i shown in FIG. 7 it is seen that at time point $t_3$ where the negative half cycle of the source voltage ends, the differentiated pulse generator circuit II generates a negative differentiated pulse $V_{15}$ because the NOR element has the one input at a null voltage $V_{14}$. The negative differentiated pulse $V_{15}$ is applied to the bistable multivibrator I. That is, that pulse passes through diodes 136 and 138 to trigger the transistors 120 and 122 to change the output $V_{16}$ from its positive to its null magnitude (see waveform f, FIG. 7). This results in the differentiated pulse generator circuit I generating a negative differentiated pulse $V_{17}$ as shown at waveform g in FIG. 7. That negative pulse $V_{17}$ is applied to the bistable multivibrator II after having passed through the diodes 136a and 138a, whereupon the output $V_{18}$ from the multivibrator II changes from its null to its positive magnitude (see waveform h, FIG. 7).

As shown at waveforms b and h in FIG. 7, the output $V_{18}$ from the bistrable multivibrator II is maintained positive at and after time point $t_3$ as long as the control signal $V_2$ is present across the input terminals B and C. This is, the output $V_{18}$ from the multivibrator II does not change. Under these circumstances, the "NOR" element always delivers a null output $V_{19}$ (see waveform i, FIG. 3) to the shortcircuiting transistor 114 whereby the phase control capacitor 42 is released from ground. As a result, the primary winding of the pulse transformer 46 produces pulses $V_{21}$ at a phase relative to the source voltage determined by the control signals $V_2$ one for each half cycle of the source voltage to fire alternately the thyristors 18 and 20 (see FIG. 1) as in the arrangement of FIG. 4.

If the control signal $V_2$ is applied to across the input terminals B and C at time point $t_0'$ in a positive half cycle of the source voltage then, the waveforms except for waveforms a, d, j and k are changed to substantially as shown in dotted lines in FIG. 7. More specifically, the differentiated pulse generator circuit III responds to the control signal $V_2$ to produce a positive differentiated pulse $V_{13}$ (see dotted line waveform c, FIG. 7) which, in turn sets the outputs $V_{16}$ and $V_{18}$ from the bistable multivibrators I and II to the null magnitude. Also the "NOR" element has a null voltage $V_{14}$ at the one input and therefore delivers a positive output $V_{19}$ to the transistor 114 (see waveform d and dotted line waveform i, FIG. 7). Thus the phase control capacitor 42 is shortcircuited by the now conducting transistor 114 through the resistor 116 thereby producing no pulse from the primary winding of the pulse transformer 46 between time points $t_0'$ and $t_2$.

Also at time point $t_0'$ the other input $V_{18}$ to the NOR element is triggered from its positive to its null magnitude (see dotted line waveform h, FIG. 7) and the one input $V_{14}$ thereto is maintained null. This causes the differentiated pulse generator circuit II to produce a negative differentiated pulse $V_{15}$ (see dotted line waveform e, FIG. 7). That pulse $V_{15}$ triggers the output $V_{16}$ from the bistable multivibrator I from its null to its positive magnitude as shown in the dotted line waveform f in FIG. 7. This results in the differentiated pulse generator circuit I generating a positive differentiated pulse $V_{17}$ (see dotted line waveform g, FIG. 3). However, the output $V_{18}$ from the bistable multivibrator II remains null (see dotted line waveform h, FIG. 7).

After time point $t_2$, the arrangement of FIG. 6 repeates the process as above described in conjunction with the application of the control signal $V_2$ at time point $t_0$.

From the foregoing it is seen that, in the arrangement of FIG. 6, the application of a control signal thereto at any phase of the source voltage inhibits the firing of the braking thyristor 18 or that braking thyristor differentially supplied with the source voltage and the induced voltage across the controlled induction motor upon initiating the DC braking control during that half cycle of the source voltage in which the control signal was applied to the arrangement and also during the next succeeding half cycle.

Therefore the present invention is effective for suppressing the abnormal DC control torque produced by an induction motor under the influence of an induced voltage thereacross, to a magnitude which is nearly zero.

While the present invention has been illustrated and described in conjunction with a few preferred embodiments thereof it is to be understood that numerous changes and modifications may resorted to without departing from the spirit and scope of the present invention. For example, the present invention is equally applicable to DC control using rectifier bridges, indirect DC control including the control of the particular AC voltage and the rectification of the controlled AC voltage etc.

What we claim is:

1. An induction motor control system comprising:
   an AC voltage source for producing an AC voltage;
   an induction motor;
   a rectifier circuit means connected between said AC voltage source and said induction motor, including at least two unidirectional braking thyristors, each of said thyristors having associated therewith one half cycle of said AC voltage, for applying a DC voltage to said induction motor and controlling the DC braking torque produced by said induction motor;
   a gate pulse generator circuit having a DC braking control signal applied thereto, connected to said rectifier circuit means and said AC voltage source, including a firing circuit connected to said braking thyristors, for firing said braking thyristors, for firing a predetermined one of said braking thyristors during the next succeeding half cycle of said AC voltage associated with said predetermined one of said braking thyristors following the application of said DC braking control signal and thereafter for firing each of said braking thyristors during the associated half cycle of said AC voltage.

2. An induction motor control system as claimed in claim 1 wherein: said firing circuit comprises a phase control capacitor, a pulse transformer having a primary winding electrically connected across said phase control capacitor and secondary windings electrically connected to said respective braking thyristors and a charge control means for charging said phase control capacitor during the application of said DC braking control signal and for discharging said phase control capacitor through said primary winding of said pulse transformer when the charge on said phase control capacitor reaches a predetermined level; and wherein said gate pulse generation circuit means further comprises a first differentiator responsive to the zero crossings of said AC voltage for generating positive differentiated pulses in response to the negative going zero crossings and negative differentiated pulses in response to the positive going zero crossings, a bistable multivibrator connected to said primary winding of said pulse transistor and said first differentiator, for producing a positive output upon discharge of said phase control capacitor, and for producing a null output upon production of a positive differentiated pulse by said first differentiator, an inverting half wave rectifier circuit connected to said AC voltage source for producing a positive pulse during the negative half cycle of said AC voltage and a null output during the positive half cycle of said AC voltage, a first "NOR" element connected to said bistable multivibrator and said inverting half wave rectifier circuit for producing a positive output only when said bistable multivibrator and said inverting half wave rectifier circuit each produce a null output, a second "NOR" element connected to said first "NOR" element, said inverting half wave rectifier circuit and said phase control capacitor, including a unidirectional thyristor having an anode electrode connected to said inverting half wave rectifier circuit whereby said unidirectional thyristor is inhibited from conducting during the positive half cycle of said AC voltage and a transistor having a base electrode connected to said first "NOR" element and the cathode electrode of said unidirectional thyristor, for discharging said phase control capacitor when either said first "NOR" element produces a positive output or said unidirectional thyristor is in a conducting state, and a second differentiator connected to the gate electrode of said unidirectional thyristor having said DC braking control signal applied thereto for producing a positive differentiated pulse upon application of said DC braking control signal for firing said unidirectional thyristor.

3. An induction motor control system as claimed in claim 1, wherein said charge control means comprises means for charging said phase control capacitor at a rate dependent upon the magnitude of said DC braking control signal.

4. An induction motor control system comprising:
an AC voltage source for producing an AC voltage;
an induction motor;
a rectifier circuit means connected between said AC voltage source and said induction motor, including at least two unidirectional braking thyristors, each of said braking thyristors having associated therewith one half cycle of said AC voltage, for applying a DC voltage to said induction motor and controlling the DC braking torque produced by said induction motor;
a gate pulse generator circuit having a DC braking control signal applied thereto, connected to said rectifier circuit means and said AC voltage source, including a firing circuit connected to said braking thyristors for firing said braking thyristors, for inhibiting the firing of a predetermined one of said braking thyristors during the half cycle of said AC voltage of application of said DC braking control signal and the next succeeding half cycle of said AC voltage and thereafter for firing each of said braking thyristors during the associated half cycle of said AC voltage.

5. An induction motor control system as claimed in claim 4 wherein said firing circuit comprises a phase control capacitor, a pulse transformer having a primary winding electrically connected across said phase control capacitor and secondary windings connected to said respective braking thyristors and a charge control means for charging said phase control capacitor during the application of said DC braking control signal and for discharging said phase control capacitor through said primary winding of said pulse transformer when the charge on said phase control capacitor reaches a predetermined level, and wherein said gate pulse generation circuit further comprises a first bistable multivibrator circuit having first and second input terminals for producing a null output upon application of a positive pulse to said first input terminal and for producing a positive output upon application of a negative pulse to said second input terminal, a first differentiator connected to said first bistable multivibrator circuit for producing a positive pulse in response to a rise in the output of said first bistable multivibrator circuit and for producing a negative pulse in response to a fall in the output of said first bistable multivibrator circuit, a second bistable multivibrator circuit having a first input terminal and a second input terminal connected to said first differentiator for producing a null output upon application of a positive pulse to said first input terminal and for producing a positive output upon application of a negative pulse to said second input terminal, an inverting half wave rectifier circuit connected to said AC voltage source for producing a positive pulse during the negative half cycle of said AC voltage and a null output during the positive half cycle of said AC voltage, a "NOR" element connected to said second bistable multivibrator circuit and said inverting half wave rectifier circuit for producing a positive output onl when said second bistable multivibrator circuit and said inverting half wave rectifier circuit each produce a null output, a second differentiator connected to said "NOR" element and having an output connected to said second input terminal of said first bistable multivibrator circuit for producing a positive pulse in response to a fall in the output of said "NOR" element and for producing a negative pulse in response to a rise in the output of said "NOR" element, a discharging circuit connecttted to said "NOR" element and said phase control capacitor for discharging said phase control capacitor when said "NOR" element produces a positive output and a third differentiator having said DC braking control signal applied thereto and having an output connected to said first input terminals of said first and second bistable multivibrator circuits for producing a positive pulse upon application of said DC braking control signal.

6. An induction motor control system as claimed in claim 4 wherein upon firing said predetermined one of said braking thyristors a DC braking voltage is induced across said induction motor and said AC voltage and said DC braking voltage are differentially applied across the anode electrode and the cathode electrode of said predetermined one of said braking thyristors.

* * * * *